United States Patent [19]

Rozsa

[11] Patent Number: 5,147,620

[45] Date of Patent: Sep. 15, 1992

[54] PROCESS FOR THE PURIFICATION OF GASEOUS STREAMS

[75] Inventor: Istvan K. Rozsa, Mt. Clemens, Mich.

[73] Assignee: Linko Enterprises, Inc., Mt. Clemens, Mich.

[21] Appl. No.: 363,631

[22] Filed: Jun. 8, 1989

[51] Int. Cl.$^5$ .................. C01B 17/16; C01B 31/20; C01B 17/02

[52] U.S. Cl. .................. 423/224; 423/220; 423/225; 423/573.1; 423/576.5; 422/227

[58] Field of Search ............ 423/226, 224, 220, 225, 423/231, 573.1, 571, 27, 576.5; 422/227

[56] References Cited

U.S. PATENT DOCUMENTS

| | | | |
|---|---|---|---|
| 1,380,067 | 5/1921 | Koch et al. | 422/227 |
| 1,404,227 | 1/1922 | Allbright | 422/227 |
| 2,438,204 | 3/1948 | Castner | 422/227 |
| 2,830,673 | 4/1958 | Bungas | 183/11 |
| 3,079,223 | 2/1963 | Lewis | 23/3 |
| 3,445,021 | 5/1969 | Johnson | 215/9 |
| 3,761,569 | 9/1973 | Heiba et al. | 423/224 |
| 3,849,540 | 11/1974 | Maddox et al. | 423/224 |
| 4,132,758 | 1/1979 | Frankiewcz et al. | 423/27 |
| 4,156,712 | 5/1979 | Kanai et al. | 423/224 |
| 4,189,461 | 2/1980 | Lueders et al. | 423/27 |
| 4,192,854 | 3/1980 | Harvey et al. | 423/120 |
| 4,207,298 | 6/1980 | Erickson | 423/210.5 |
| 4,238,462 | 12/1980 | Hardison | 423/224 |
| 4,251,495 | 2/1981 | Deschamps et al. | 423/230 |
| 4,370,306 | 1/1983 | Kirchner | 423/224 |
| 4,545,945 | 10/1985 | Prave et al. | 422/227 |
| 4,595,577 | 6/1986 | Stas et al. | 423/224 |
| 4,643,972 | 2/1987 | Young | 422/227 |
| 4,693,881 | 9/1987 | Miller | 423/573.1 |
| 4,729,889 | 3/1988 | Flytani-Stephanopulos et al. | 423/210.5 |
| 4,774,021 | 9/1988 | Najjar et al. | 252/373 |

*Primary Examiner*—Gary P. Straub
*Attorney, Agent, or Firm*—Dykema Gossett

[57] ABSTRACT

A process for removing hydrogen sulfide from natural gas and other gas streams. By passing a natural gas or other gas stream having a hydrogen sulfide ($H_2S$) component through an aqueous solution of copper (II) ions ($Cu^{++}$), the hydrogen sulfide component is converted to copper sulfide (CuS). The copper (II) ion solution is prepared by admixing powdered copper (Cu) with an aqueous solution of nitric acid ($HNO_3$). The copper (II) ion solution is regenerated from the copper sulfide by treatment with nitric acid which liberates nitrogen dioxide ($NO_2$). The nitrogen dioxide is used to generate nitric acid for the copper sulfide regeneration stage. In another aspect, a reaction vessel is provided which includes a centrally disposed circulation tube that enhances the mass transfer and circulation characteristics of gas purification processes.

1 Claim, 2 Drawing Sheets

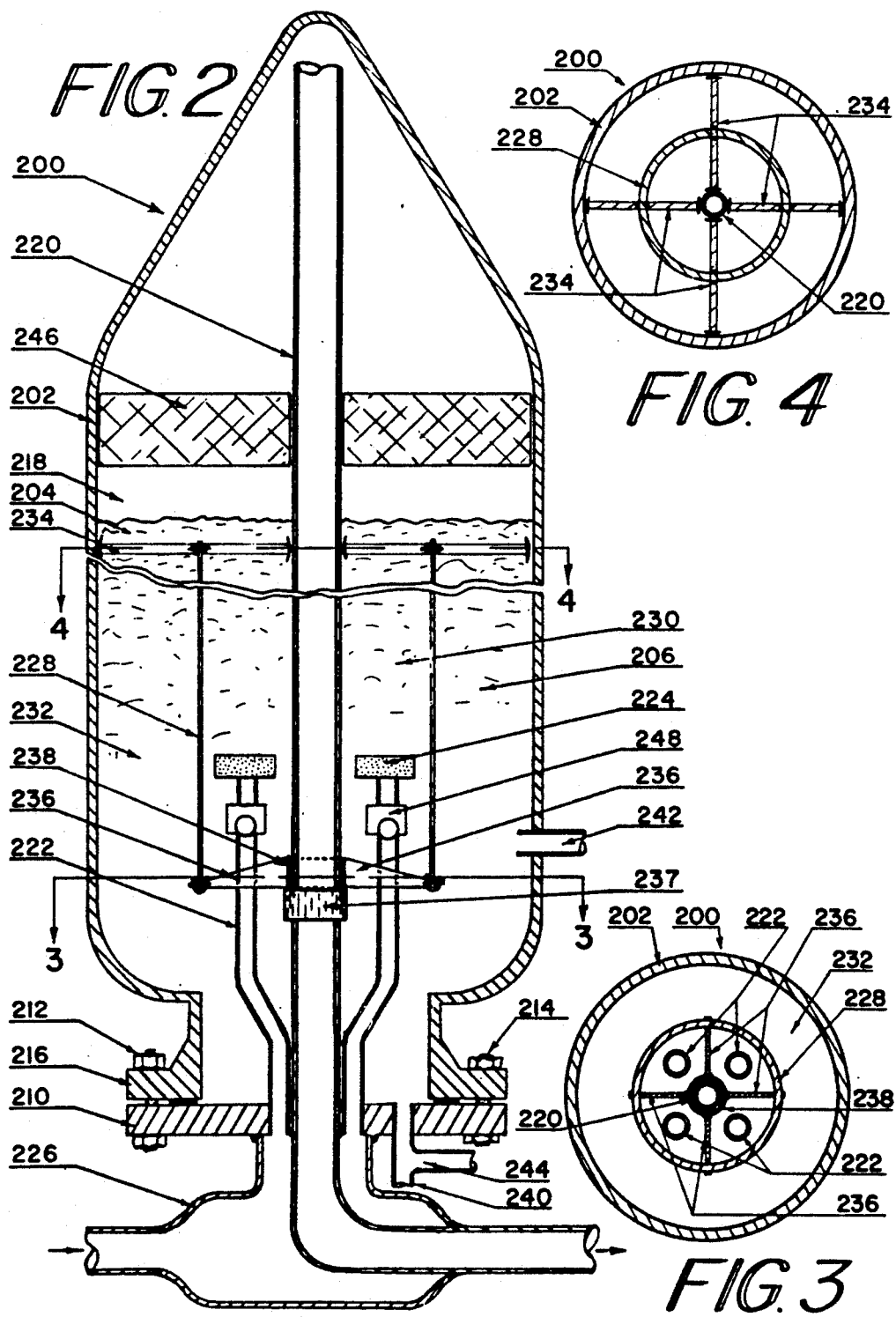

PROCESS FOR THE PURIFICATION OF GASEOUS STREAMS

TECHNICAL FIELD

The present invention relates generally to methods for removing unwanted gaseous constituents of gas streams such as the purification of natural gas streams to remove hydrogen sulfide and the like. More specifically, the present invention provides a method of removing hydrogen sulfide from natural gas in a continuous closed system that includes a reagent regeneration stage.

BACKGROUND OF THE INVENTION

There are many methods available by which gas-phase impurities are removed from gas streams. These impurities may comprise carbon dioxide, sulfur oxides, nitrogen compounds, and/or hydrogen sulfide. Some methods are specific to a particular application while others may be useful in purifying gas streams from several sources. These prior art methods may consist of a simple single wash of the stream or complicated multiple-step washes with regeneration stages. The sources of gas streams are nearly as varied as the methods used to treat the streams. Moreover, in many instances the compositional characteristics of a gas stream may differ from site to site as well as change over time at a single site.

More specifically, it will be appreciated by those skilled in the art of gas purification that there currently exist numerous large, unproduced reserves of natural gas in the United States and abroad. As will also be known, the natural gas contained within these unproduced reserves typically contains sulfur compounds, including a substantial amount of hydrogen sulfide ($H_2S$). The hydrogen sulfide content of natural gas makes the raw gas unsuitable for most uses. Therefore, in order to utilize natural gas supplies having high concentrations of hydrogen sulfide, the raw feedstock gas must be purified to remove a substantial portion of the hydrogen sulfide. Although the process of the present invention is principally directed to the purification of natural gas streams by the elimination or reduction of hydrogen sulfide, the present invention may be suitable for use in purifying other gas streams where unwanted hydrogen sulfide is present.

The most common process for removing hydrogen sulfide from natural gas, i.e. "sweetening sour gases" utilizes an alkanolamime solution through which the raw feedstock gas is passed. Alkanolamimes act as absorbents for acidic gases, including hydrogen sulfide. The two alkanolamimes which are most commonly utilized in gas purification are monoethanolamine (MEA) and diethanolamine (DEA). Diisopropanolamine (DIA) is also used to some extent in the purification of gas streams as well as methyldiethanolamine (MEDA), the latter being selectives for the absorption of $H_2S$ in the presence of carbon dioxide. Various other additives are often included such as corrosion and foam inhibitors. In the absorber, $H_2S$ reacts to form amine sulfide and hydrosulfide. The flow regime in most alkanolamime plants includes the passage of the raw gas upward through an absorber containing the alkanolamine solution. The rich solution is pumped from the bottom of the absorber to a stripping column and may be flashed to remove hydrocarbons remaining from the absorption process. The hydrogen sulfide is removed in the stripping column and the water vapor portion is condensed to be fed back to the absorber. A number of modifications and improvements have been made on this basic process. However, as will be known by those skilled in the art, an amine plant is extremely expensive particularly from the standpoint of initial capitalization.

It is also known to convert $H_2S$ recovered in this manner to sulfur by firing the hydrogen sulfide in the combustion chamber to convert at least a portion of it to $SO_2$. The $SO_2$ is then passed over a catalyst at high temperatures to yield sulfur and water vapors. The sulfur is then isolated by condensing the vapors. This process has a number of drawbacks, including the high temperatures required and the need for a solid catalyst. Moreover, $SO_2$ is quite corrosive at high temperatures.

It is also known to remove hydrogen sulfide from natural gas using iron oxide. Typically, iron oxide is placed on a carrier such as wood chips or the like. The impregnated carrier is then loaded into a vessel with a liquid. Sour gas is bubbled through the vessel and contacts the iron oxide on the carrier. While this method effectively removes hydrogen sulfide from the gas stream, it is both costly and labor-intensive from the standpoint of maintenance. Moreover, considerable down time is required due to the need to remove the spent wood chips which fuse into a solid mass.

In U.S. Pat. No. 3,849,540 a process for removing hydrogen sulfide from natural gas is disclosed in which the hydrogen sulfide is removed using a catalytic reaction. Therein, natural gas is treated with an aqueous solution containing dissolved oxygen and a transition metal catalyst which, as stated, may comprise a copper salt. In U.S. Pat. No. 4,130,403, membrane separation units are disclosed for use in separating hydrogen sulfide from hydrocarbon streams. In U.S. Pat. No. 3,079,223, a process is disclosed by which hydrogen sulfide in a hydrocarbon stream is removed by contacting the gas stream with fluidized solids containing copper. In U.S. Pat. No. 4,192,854, a process is disclosed for the removal of hydrogen sulfide and ammonia from gaseous streams in which a closed-loop scrubbing of the stream is carried out with a copper sulfate-ammonium sulfate solution to yield a copper sulfide precipitate.

In the present invention, the numerous drawbacks inherent in these prior art methods are overcome by providing a process for removing hydrogen sulfide from gaseous streams which is particularly useful in the removal of hydrogen sulfide from natural gas streams. The process may be operated as a closed-loop system and is both efficient and economical. In addition, the present invention provides a reaction vessel which is conveniently used in carrying out the process of the present invention.

SUMMARY OF THE INVENTION

In accordance with the present invention, in one aspect there is provided a process for removing hydrogen sulfide from a gas stream. The invention is particularly adapted for the removal of hydrogen sulfide from natural gas streams and is suitable for use at the well site. Accordingly, an aqueous solution of copper (II) ions [$Cu^{++}(aq)$] is prepared by the treament of the copper, preferably in the form of a powder, with an aqueous nitric acid solution.

The copper (II) ion solution substantially fills an absorption vessel, preferably the novel absorption vessel of the present invention. The absorption vessel is substantially gas-tight. It includes means for introducing and withdrawing fluid from the vessel chamber and means for both introducing a raw, hydrogen-sulfide contaminated natural gas stream into the vessel and for withdrawing a purified natural gas stream from the vessel.

In the present invention the concentration of hydrogen sulfide in the raw feedstock natural gas stream is reduced or substantially eliminated by flowing the raw feedstock stream through the copper (II) ion solution in the absorption vessel. By contacting the contaminated gas with the copper (II) ions in aqueous solution, the hydrogen sulfide component reacts with copper (II) ions to form a copper sulfide precipitate in the aqueous solution. Depending on the residence time of the gas, the mass transfer rate between the phases, and the concentration of the reactants, the hydrogen sulfide component of the raw feedstock gas can be substantially eliminated in a single pass through the absorber.

The resulting purified natural gas is then collected in a gas space above the ion solution in the vessel. The copper sulfide formed during the purification process may be periodically removed from the copper (II) ion solution.

In another aspect, the present invention provides a closed-loop process for removing hydrogen sulfide from a natural gas stream. Accordingly, the above-stated process is extended by regenerating the copper (II) ion solution. The regeneration stage is carried out by removing the copper sulfide formed in the absorber and treating it with an aqueous nitric acid solution. This reaction forms copper (II) ions, elemental sulfur, nitrogen dioxide ($NO_2$), nitric oxide (NO), and water. The elemental sulfur, which is a commercially significant commodity, is collected. The gases which are formed are flowed to a nitric acid production unit which forms a part of the closed-loop system.

The nitric oxide fraction of the gases produced during regeneration of the copper (II) ions is converted to nitrogen dioxide by adding an oxygen-containing gas such as air to the nitric oxide. The aqueous copper (II) ion solution is flowed to the absorption vessel for hydrogen sulfide removal. The nitrogen dioxide from the copper sulfide conversion step, and from the oxidation of nitric oxide, are then passed through water in the nitric acid plant. This internal source of nitric acid is used in the copper sulfide conversion stage. Accordingly, a substantially continuous purification process which is both economical and efficient for the removal of hydrogen sulfide from gas streams such as contaminated natural gas is provided.

In still another aspect the present invention provides a novel absorption vessel for use in purifying gas streams. The inventive vessel includes a chamber in which a circulation tube is vertically disposed. The circulation tube is generally centrally positioned within the absorption vessel and is spaced from the inner walls of the vessel by cantilever-like spacers. The placement of the circulation tube defines an annulus with respect to the inner wall of the absorption vessel. A purified gas collection tube extends from the bottom of the vessel through the bore of the circulation tube and terminates in a gas space at the top of the vessel chamber.

A plurality of gas pipes lead into the chamber with the terminal ends of the pipes being positioned in the bore of the circulation tube. Each terminal end is equipped with a gas diffusion head. The diffusers are spaced from the top of the circulation tube such that gas flowing from the diffuser must pass upwardly through the bore of the circulation tube rather than dispersing laterally throughout the vessel chamber. This arrangement causes gas bubbles exiting the top of the circulation tube to move with the flow of the liquid and to momentarily move downwardly into the annulus. This increases the circulation of the gas-purifying solution and the residence time of the gas bubbles in the solution. Moreover, the turbulence of the gas exiting the diffusers is controlled in this manner such that the extent to which the gas bubbles coalesce in the liquid phase is minimized. This in turn maximizes mass transfer between the phases. The purified gas then moves into the gas space and flows out of the absorption vessel through the gas collection tube.

In still another aspect, the novel absorption vessel of the present invention is used in connection with hydrogen sulfide from natural gas stream as provided by the process of the present invention.

These and other features and advantages of the present invention will be more fully described in the following description of the preferred embodiments of the invention and in connection with the drawings in which:

BRIEF DESCRIPTION OF THE DRAWINGS

FIG. 2 is a side elevational view of the inventive absorption vessel of the present invention.

FIG. 3 is a section along lines 3—3 of FIG. 2.

FIG. 4 is a section along lines 4—4 of FIG. 2.

DESCRIPTION OF THE PREFERRED EMBODIMENTS OF THE INVENTION

Figure 1:
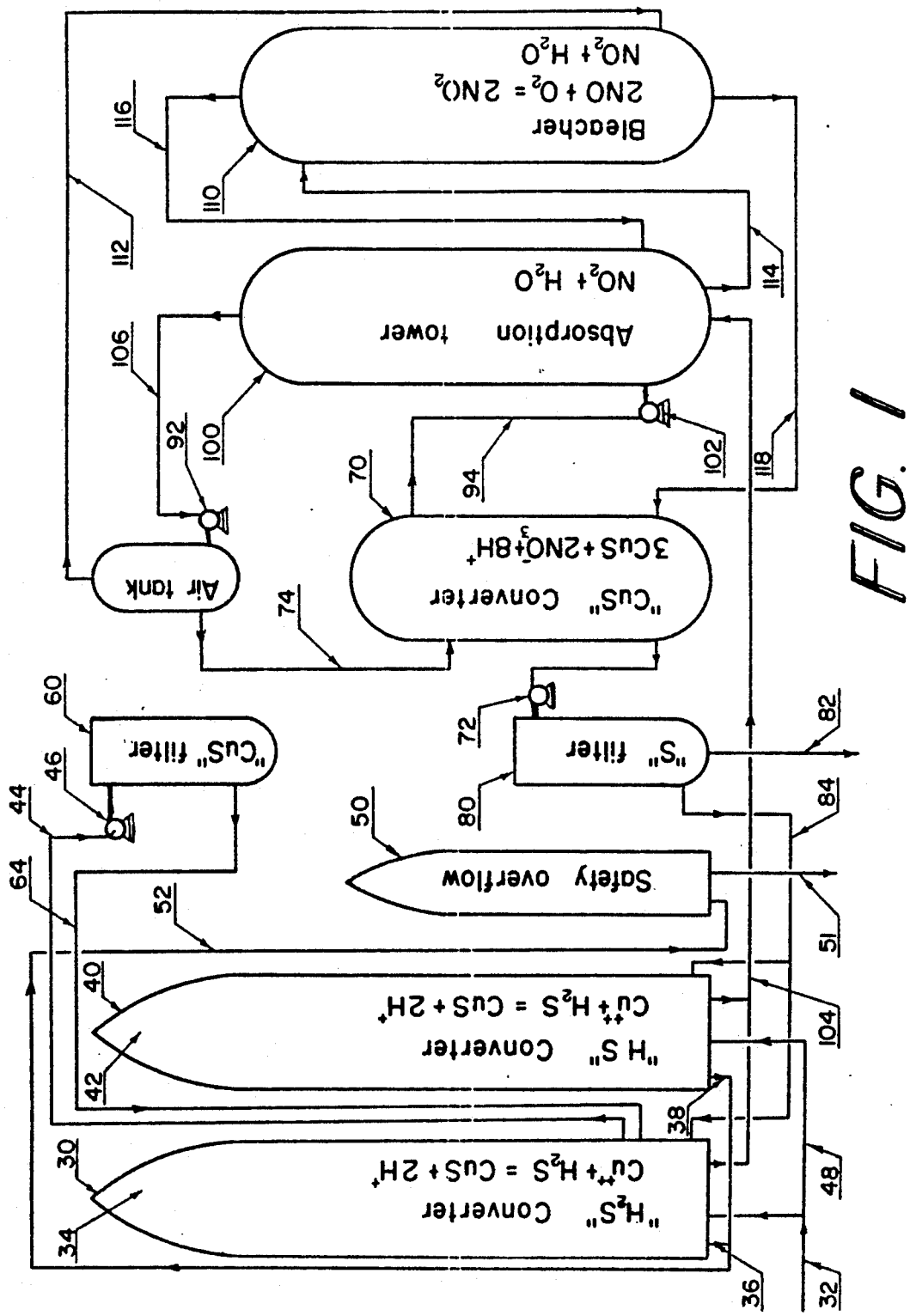
FIG. 1 is a block diagram which illustrates the process of the present invention in one embodiment.

Referring now to FIG. 1 of the drawings in which like numerals designate like parts, absorption or reaction vessel 30 is shown, which is designed "$H_2S$ converter", and in which the principal reaction of present invention is carried out. Reaction vessel 30 may comprise any number of configurations, one of which is the inventive reaction vessel of the present invention which is described in detail herein. Reaction vessel 30 may be formed of a number of materials, such as steel, preferably stainless steel. In order to reduce corrosion of the inner walls of reaction vessel 30, the walls may be treated with a corrosion-resistant material. Reaction vessel 30 is substantially gas-tight and is adapted to receive and contain the liquid used in the purifying process of the present invention. The dimensions of reaction vessel 30 are not critical, but it is preferred that the vessel have a capacity of from about 400 to about 1000 gallons. In the most preferred embodiment of the present invention, a second absorption or reaction vessel 40 is also provided which is used for continuous operation of the gas purification system, as will be more fully explained herein.

In order to remove hydrogen sulfide from a gas source, preferably a source of natural gas which is contaminated by hydrogen sulfide ($H_2S$), reaction vessels 30 and 40 are partially filled with a gas-purifying solution. The gas-purifying solution of the present invention comprises an aqueous solution of copper (II) ions. While the concentration of copper (II) ions may vary somewhat, it is preferred that the aqueous solution which is used for the removal of hydrogen sulfide in accordance with the present invention preferably contain from about 10 to about 20 percent by weight, more preferably from about 15 to about 19 percent by weight, and most preferably from about 16 to about 18 percent by weight copper (II) ions. Concentrations outside these ranges may be suitable in some applications. It has been found that an aqueous solution which contains approximately 17.7 percent by weight copper (II) ions provides excellent results in removing substantially all hydrogen sulfide from the contaminated natural gas stream.

In one embodiment of the present invention, the copper (II) ion solution is formed by treating the copper with nitric acid. This is preferably carried out in a separate vessel with the resulting liquid products being pumped to reaction vessels 30 and 40. It is most preferred that the copper be provided in the form of a powder which facilitates rapid reaction between the powdered metal and the nitric acid solution. In one embodiment of the invention, from about 10 to about 12 liters of nitric acid, wherein the nitric acid has a concentration of from about 45 to about 65 percent by weight is mixed with about 27 to about 32.4 kg. powdered copper. For example, a 60 percent nitric acid solution provides good results in the present invention. Therefore, it will be recognized that in a preferred embodiment of the present invention powdered copper is dissolved in nitric acid to form the cupric ion ($Cu^{++}$) in the following reaction:

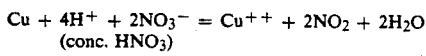
(conc. $HNO_3$)

As will be more fully explained hereinafter, the nitric oxide (NO) and nitrogen dioxide ($NO_2$) which is liberated during this reaction may be used to generate an internal source of nitric acid for use in forming the gas purifying solution of the present invention.

Once reaction vessel 30 is filled with the copper (II) ion solution, the gas to be purified, preferably natural gas containing hydrogen sulfide, is injected into reaction vessel 30, preferably as a pressurized gas stream, i.e. from about 15 to about 3000 psia. This is achieved as shown in FIG. 1 of the drawings through line 32, which is shown as leading into the base of reaction vessel 30. In this manner, the injected gas stream forms gas bubbles which move upwardly through the copper (II) ion solution. As the gas bubbles pass through the solution, hydrogen sulfide in the impure gas reacts with the copper (II) ions to form copper sulfide (CuS) and hydrogen gas ($H_2$). The pressure within reaction vessel 30 is preferably maintained at between about 15 lbs. to about 400 lbs. psia and is preferably operated at a temperature of from about $-10°$ to about $60°$ C. The pressure can be maintained by a regulator in association with a gas well head or the like, and the preferred temperature range allows operation of the system at ambient temperatures. The pH is optimally between 1.9 and 2.0.

After the gas stream has passed through the copper (II) ion solution, it preferably enters a gas space above the surface of the copper (II) ion solution, indicated as gas space 34 in FIG. 1. Similarly, reaction vessel 40 has a corresponding gas space 42. While these gas spaces are the preferred configuration, it would of course be possible to vent the purified gas stream from the reaction vessel through an outlet without necessarily providing a gas space. The purified natural gas which enters the gas space has a significantly reduced $H_2S$ concentration and, in many instances, the concentration of $H_2S$ in the purified gas stream will be less than 5 parts per million. The purified gas stream is then flowed from reaction vessel 30 through gas collection line 36 to safety overflow 50 and out gas outlet line 51. Safety overflow 50 is in flow communication with reaction vessels 30 and 40 via line 52. The function of safety overflow 50 is to provide a safety value in the event that the pressure inside one of the reactors reaches a predetermined critical value. Hence, it will be appreciated that in one aspect the present invention provides a method of removing hydrogen sulfide from a gas stream, such as a natural gas stream which is contaminated with hydrogen sulfide, by passing the sour gas through an aqueous solution of copper (II) ions such that the copper ions react with the hydrogen sulfide to form copper sulfide.

It is estimated that in a cylindrical reaction vessel having a capacity of about 1600 liters, which is filled with approximately 1400 liters of copper (II) ion solution wherein the concentration of $Cu^{++}$ is about 17 percent by weight, and where the concentration of $H_2S$ in the treated gas is approximately 10 grain per 100 SCf, substantially all of the $H_2S$ can be removed by passing the sour gas through a column of approximately 4.4 meter of copper (II) ion solution. The solution need not be replenished under these conditions until approximately 120 MMSCf have been purified.

In one embodiment, the present invention provides a closed-loop system for the continuous purification of gas streams in a manner in which the necessary reagents are essentially conserved in the system. In this aspect, and referring again to FIG. 1 of the drawings, the copper sulfide which is formed in the purification process is principally suspended in the copper (II) ion solution. The majority of the suspended copper sulfide resides near the bottom of reaction vessel 30. That is, a copper sulfide-rich solution occupies the lower portion of the reaction vessel. The accumulated copper sulfide is removed at predetermined intervals by pumping the CuS through line 44 using pump 46 to filter 60.

In one embodiment of the present invention, filter 60, which, as will be recognized by those skilled in the art may comprise any number of filter materials, is used intermittently to filter copper sulfide from the copper sulfide-rich solution from reaction vessel 30. For example, the shunt to the filter may be activated once every three months of gas purification. Depending of course upon the relative volumes of the flow lines, reaction vessels, etc., as well as the dynamics of pump 46, the suspended copper sulfide may be filtered from the copper (II) ion solution in typically ten to sixty minutes. The removal of copper sulfide from filter 60 is shown by line 62. The copper (II) ion solution from which the copper sulfide has been removed is then returned to reaction vessel 30 through line 64.

In one particular embodiment of the present invention, both reaction vessels 30 and 40 are utilized. In this embodiment, the flow of sour gas through line 32 may be directed to reaction vessel 40 through line 48. Reaction vessel 40 operates in the same manner as that described for reaction vessel 30. As will be more fully explained, the purification of natural gas is switched over to reaction vessel 40 during a regeneration stage.

Still referring to FIG. 1 of the drawings, in order to regenerate copper (II) ions in the present invention, the copper sulfide which is removed using filter 60 is conveyed to another reaction vessel, copper sulfide converter 70. It is to be noted that copper sulfide converter 70 may be used during the initial start-up of the system for the purpose of combing the powdered copper and concentrated nitric acid to form the copper (II) ion solution which is then pumped to reaction vessel 30. In the copper (II) ion regeneration stage, copper sulfide is added to the converter and is then treated with nitric acid to bring about the following reaction:

$$CuS + HNO_3 = Cu^{++} + NO_2 + NO + S + H_2O$$

As will be explained more fully, the nitric acid used in this step is preferably internally generated. Reaction vessel 70 may be made of any material suitable for containing the reactants, and no particular geometry is needed. An aqueous nitric acid solution of approximately 45 to about 65 percent $HNO_3$ by weight is utilized with which the copper sulfide is mixed at 48.8° C. As will be appreciated by those skilled in the art, and with reference to all of the reactions of the present invention, stoichiometric quantities of the reactants are acceptable. The elemental sulfur which is produced in the CuS conversion stage is removed from the solution by pumping the reaction products using pump 72 through sulfur filter 80 to collect the elemental sulfur which is shown as being removed from filter 80 by line 82. It will be recognized by those skilled in the art that sulfur is a valuable commodity, and its collection in this manner adds to the cost efficiency of the present invention. Following the removal of elemental sulfur from the reaction products, there remains an aqueous solution of copper (II) ions which is pumped through line 84 to reaction vessel 30. Thus, in this manner, the copper (II) ion solution is replenished.

As stated earlier, the present invention also contemplates the internal production of nitric acid for use in the conversion of copper sulfide in the closed-loop, continuous gas purification system of the present invention. Accordingly, it will be recognized that two of the reaction products from the copper sulfide conversion step are nitrogen dioxide and nitric oxide. In order to convert nitric oxide to nitrogen dioxide, an oxygen-containing gas such as air is supplied through line 74 from tank 90 which is equipped with air compressor 92. By introducing oxygen into converter 70, nitric oxide is oxidized to nitrogen dioxide. The nitrogen dioxide is then vented from converter 70 through line 94 to an absorption tower 100 with the use of gas compressor 102.

It will be understood that as the copper sulfide accumulates and is removed from reaction vessel 30, the remaining aqueous copper (II) ion solution is progressively depleted of copper (II) ions. In order to replenish the concentration of copper (II) ions in the solution, a series of valves (not shown) may be activated such that the incoming sour gas is diverted to reaction vessel 40. The contents of reaction vessel 30, i.e. the depleted aqueous copper (II) ion solution, is then flowed to absorption tower 100 via line 104. The nitrogen dioxide from converter 70 is injected into absorption tower 100 where it contacts the spent copper (II) ion solution. In this manner, nitric acid is formed according to the following reaction:

$$NO_2 + H_2O = HNO_3 + NO$$

The nitric oxide which is formed in this reaction is then converted to nitrogen dioxide by venting the NO through line 106 to air tank 90 using compressor 92. Again, the nitric oxide is converted to nitrogen dioxide which is in turn flowed from air tank 90 to bleacher tower 110 via line 112. The nitric acid which is formed in absorption tower 100 is flowed through line 114 to bleacher tower 110 in order to further concentrate the nitric acid. As will be appreciated, the nitrogen dioxide flowing through line 112 to bleacher tower 110 is bubbled through the nitric acid solution. Nitric oxide formed in bleacher 110 by the above reaction reacts with excess oxygen received through line 112 to form nitrogen dioxide and is utilized by venting it through line 116 to absorption tower 100. There, it is contacted with the solution in absorption tower 100 to produce more nitric acid. Once the nitric acid concentration in bleacher 110 has reached the required concentration, it is flowed into converter 70 through line 118 for the conversion of copper sulfide to copper (II) ion solution. Thus, $H_2S$ absorption may be switched between reaction vessels 30 and 40. In this manner, a continuous closed-loop process is provided.

Referring now to FIG. 2 of the drawings, reaction vessel 200 is shown generally comprising housing or outer shell 202 which defines chamber or cavity 204 in which the gas purification solution 206 of the present invention is contained. Although reaction vessel 200 is shown as a somewhat "bottled-shaped" construction, numerous other geometries may be suitable or even desirable in a particular application.

In one embodiment of the present invention, the lower end of reaction vessel 200 has an outlet 208 which is closed by plate 210 via connectors 212 and 214 to annular flange 216. Welded to plate 210 are a series of pipes or tubes by which sour gas is injected into chamber 204 and purified gas is removed from gas space 218. Accordingly, gas collection or recovery pipe 220 is shown which extends upwardly through plate 210 and terminates in gas space 218. A plurality of gas injection pipes 222, one of which is shown in FIG. 1, are provided by which sour gas is injected. The relationship of the gas injection tubes 222 and, in this embodiment, centrally disposed collection pipe 220 is shown best in FIG. 3 of the drawings which is a cross-section along lines 3—3 of FIG. 2.

In order to achieve good mass transfer between the gas and the gas purifying solution, it is preferred that the terminal end of each gas injection tube 222 be equipped with a gas diffuser or diffusion head 224. A sour gas is introduced into the plurality of gas injection tubes 222 using manifold 226. It was determined that gas entering the gas purifying liquid in chamber 204 produces a considerable amount of lateral turbulence which resulted coalescence of the individual bubbles which reduces surface area and thus compromises the efficiency of $H_2S$ removal. Therefore, circulation tube 228 is provided which is generally, centrally disposed in chamber 204. Circulation tube 228 has a bore 230 and defines annulus 232, the latter existing between the outer wall of the circulation tube and the inner wall of shell 202. While the relative and absolute diameters of shell 202 and circulation tube 228 are not critical, in most instances circulation tube 228 will have a diameter which is approximately 50% of the diameter of chamber 204. Circulation tube 228 preferably comprises a Plexiglas ™ or PVC tube or the like with a wall thickness of approximately 0.5 cm.

As shown both in FIGS. 2 and 3, gas injection pipes 222 and gas collection pipe 220 are disposed in bore 230 with the diffusers being spaced from the bottom of circulation tube 228 somewhat. It is preferred that this spacing from the bottom be approximately at least one-tenth the length of circulation tube 228. Circulation tube 228 is spaced from the inner wall of shell 202 by a plurality of cantilever-type spacers 234. One end of each cantilever-type spacer is connected to circulation tube 228, and the other end is in sliding contact with the inner wall of shell 202. Similarly, cantilever-type spacers, one of which is shown as cantilever spacer 236, are connected to the inner wall of the circulation tube and to a sleeve 238 in sliding contact with centrally disposed gas collection tube 220. The exact function of these sliding spacers, in addition to serving the function of maintaining the relative position of collection tube 228, will be more fully described hereinafter.

Referring now specifically to FIG. 2 of the drawings, a drain 240 is provided in plate 210 by which the contents of chamber 204 can be drained. In addition, means for introducing a liquid into chamber 204 and withdrawing liquid from chamber 204 is also provided by pipes 242 and 244. As will be appreciated from the previous explanation of the process of the present invention, pipes 242 and 244 are generally utilized to flow solution 206 to a filter (not shown) during operation of vessel 200. In one preferred embodiment, they may also be used with the appropriate valving to inject regenerated copper (II) ion solution into chamber 204. Mist eliminator 246 is also provided to reduce foaming which could otherwise result in liquid entering gas collection tube 220.

In the most preferred embodiment, a solution of copper (II) ions is pumped into reaction vessel 200, such as through pipe 244. Sour gas is then flowed through gas manifold 226 whereupon it enters gas injection tubes 222 and passes through diffusers 224. This creates a plurality of bubbles of sour gas in the aqueous copper (II) ion solution 206. Note that check valves 248 are provided at the ends of gas injection tubes 222 to prevent liquid from entering the injection tubes during a start-up or the like. As the sour gas bubbles enter the aqueous copper (II) ion solution, lateral movement of the bubbles is inhibited by circulation tube 228. It has been found that the bubbles travel upwardly at the same rate as the liquid which is circulated by the movement of the gas through bore 230 which reduces coalescence of the bubbles. The bubbles then exit circulation tube 228 at its top end, move laterally and then downwardly into annulus 232. After a momentary downward movement in liquid 206 in annulus 232, the bubbles then move upwardly to gas space 218 above the solution. Any foaming which may occur is eliminated by mist eliminator 246. The purified gas then moves from gas space 218 into gas collection tube and out of reaction vessel 200. By providing circulation tube 228, the flow regime of the gas in the gas-purifying liquid provides good counterflow which helps mix liquid 206 thoroughly. Periodically, the copper sulfide content of the liquid can be removed by activating a pump (not shown) attached to one of pipes 242 and 244 to withdraw the liquid and pass it through an appropriate filter. The liquid from which, for example, copper sulfide has been removed, is then reintroduced into chamber 204 through pipe 242 or 244. Although the present invention is especially adapted to be used in the removal of hydrogen sulfide from natural gas in accordance with the present invention, it may be used in other gas purification processes. Also, the components of reaction vessel 200 may be made of a number of materials which will be recognized by those skilled in the art, and as stainless steel is particularly preferred.

If it becomes necessary to repair or service any of the internal components of reaction vessel 200, bolts 212 and 214 are removed and plate 210 is detached from flange 216. As plate 210 is removed, gas injection tubes 222 and collection tube 220, which are welded to the plate, move easily out of chamber 204. Circulation tube 228 simply slides downwardly in reaction vessel 200 due to spacers 234 and 236, and sleeve 238, the latter being supported by stop 237 attached to collection tube 220, and because it is slightly larger than the outlet, circulation tube 228 comes to rest on the floor of the reaction vessel.

These and other advantages and features of the present invention will be more fully described in connection with the appended claims and in the following examples which are not intended to in any way limit the present invention and are for purposes of illustration only.

EXAMPLE

A vertical glass vessel was filled with an aqueous solution of copper (II) ions which was produced by reacting powdered copper with concentrated nitric acid. Natural gas containing 600 grains $H_2S$ was bubbled through the solution at 15 psi. After passing the natural gas through the solution, the gas was analyzed and was found to have no detectable amount of hydrogen sulfide. The analysis of the gas before and after treatment as provided by the present invention is set forth in tables I and II, respectively, below:

TABLE I

| COMPONENT | PPM BY VOLUME |
| --- | --- |
| Carbonyl Sulfide | ND < 5 |
| Sulfur Dioxide | ND < 5 |
| Hydrogen Sulfide | 3300 |
| Methyl Mercaptan | 14 |
| Ethyl Mercaptan | 12 |
| Propyl Mercaptan | 10 |
| Butyl + Mercaptans | 4 |
| Carbon Disulfide | ND < 5 |
| Misc. Sulfides | 4 |

TABLE II

| COMPONENT | PPM BY VOLUME |
| --- | --- |
| Carbonyl Sulfide | ND < 5 |
| Sulfur Dioxide | ND < 5 |
| Hydrogen Sulfide | ND < 1 |
| Methyl Mercaptan | ND < 1 |
| Ethyl Mercaptan | ND < 1 |
| Propyl Mercaptan | ND < 1 |
| Butyl + Mercaptans | ND < 1 |
| Carbon Disulfide | ND < 5 |
| Misc. Sulfides | ND < 1 |

What is claimed is:

1. A continuous process for removing hydrogen sulfide from a stream of sour natural gas, said method comprising:

forming an aqueous solution of $Cu^{++}$ ions by combining solid copper with a nitric acid solution, said aqueous solution containing from about 10 to about 20 percent by weight $Cu^{++}$ ions and said nitric acid solution having a nitric acid concentration of from about 45 to 65 percent by weight;

placing said $Cu^{++}$ ion solution in a substantially gas-tight vessel having an outlet at its bottom and having a chamber adapted to receive a liquid and natural gas, said $Cu^{++}$ ion solution partially filling said chamber and defining a gas space in said chamber, and said vessel being operated at a temperature of from about −10° to about 60° C., said chamber having a volume of about 400 to 1000 gallons;

said chamber having a circulation tube positioned therein for increasing mass transfer between said sour natural gas and said $Cu^{++}$ ion solution and for preventing copper sulfide from clogging said bottom outlet, said circulation tube having a bore therethrough vertically disposed in said chamber and being spaced from the inner wall of said fist vessel such that an annulus is defined between said circulation tube and said inner wall of said first vessel, and wherein said aqueous solution of $Cu^{++}$ ions in said chamber fills said bore and said annulus such that said circulation tube is completely immersed in said aqueous solution;

flowing from a wellhead as a pressurized gas stream of about 15 to about 3000 psia a sour natural gas feedstock stream containing hydrogen sulfide into at least one pipe having a first end disposed in said chamber inside the bore of said circulation tube, said first end having a diffuser attached thereto and spaced from the bottom end of said circulation tube, said diffuser being immersed in said $Cu^{++}$ ion solution;

forming bubbles of said sour natural gas feedstock stream by flowing said sour natural gas stream into said $Cu^{++}$ ion solution in said bore of said circulation tube such that hydrogen sulfide in said gas bubbles is contacted by said $Cu^{++}$ ions forming a copper sulfide precipitate in said $Cu^{++}$ solution and removing hydrogen sulfide from said sour natural gas stream, wherein the pressure within said vessel is maintained at between about 15 to about 400 psia; and said gas bubbles moving upwardly through said bore of said circulation tube and then, while remaining in said $Cu^{++}$ ion solution, at least some of said gas bubbles moving downwardly into said annulus and then again upwardly into said gas space in said first vessel;

collecting from said gas space said natural gas stream from which hydrogen sulfide has been removed, wherein the hydrogen sulfide content of said collected natural gas stream is less than about 1 ppm;

removing said copper sulfide from said $Cu^{++}$ ion solution;

regenerating said $Cu^{++}$ ion solution by treating said copper sulfide with a nitric acid solution containing approximately 45 to 65 percent by weight nitric acid in a second vessel into which an oxygen-containing gas is added, wherein said treatment liberates nitrogen dioxide and nitrogen oxide and forms elemental sulfur;

producing nitric acid by flowing said nitrogen dioxide through water and returning said nitric acid so produced to said second vessel; and isolating said elemental sulfur.

* * * * *